(12) United States Patent
Yamagishi et al.

(10) Patent No.: US 11,097,375 B2
(45) Date of Patent: Aug. 24, 2021

(54) LASER PROCESSING APPARATUS AND LASER PROCESSING METHOD

(71) Applicant: FUJIKURA LTD., Tokyo (JP)

(72) Inventors: Hiroyuki Yamagishi, Tokyo (JP); Toshitaka Namba, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 652 days.

(21) Appl. No.: 15/923,239

(22) Filed: Mar. 16, 2018

(65) Prior Publication Data

US 2018/0264597 A1     Sep. 20, 2018

(30) Foreign Application Priority Data

Mar. 17, 2017  (JP) .............................. JP2017-053508

(51) Int. Cl.
| | |
|---|---|
| *B23K 26/0622* | (2014.01) |
| *B23K 26/22* | (2006.01) |
| *B23K 26/06* | (2014.01) |
| *B23K 26/082* | (2014.01) |
| *B23K 26/21* | (2014.01) |

(52) U.S. Cl.
CPC .......... *B23K 26/22* (2013.01); *B23K 26/0622* (2015.10); *B23K 26/0626* (2013.01); *B23K 26/0648* (2013.01); *B23K 26/082* (2015.10); *B23K 26/21* (2015.10)

(58) Field of Classification Search
CPC ............ B23K 26/0622; B23K 26/0626; B23K 26/0648; B23K 26/082; B23K 26/21; B23K 26/22

USPC ............. 606/2, 3, 10–13; 219/121.6, 121.61, 219/121.74, 121.75
See application file for complete search history.

(56) References Cited

U.S. PATENT DOCUMENTS

| | | | | |
|---|---|---|---|---|
| 6,135,995 | A * | 10/2000 | Arnett .................... | A61B 18/20 606/12 |
| 6,567,453 | B1 | 5/2003 | Yamamoto et al. | |
| 2011/0238048 | A1* | 9/2011 | Brown .................. | A61B 18/22 606/12 |
| 2015/0030045 | A1* | 1/2015 | Hartl ..................... | H01S 3/1312 372/38.08 |
| 2015/0037984 | A1* | 2/2015 | Zhang ................ | B23K 26/0622 438/799 |
| 2016/0377848 | A1* | 12/2016 | Wu ........................ | H05G 2/006 250/504 R |

(Continued)

FOREIGN PATENT DOCUMENTS

| | | |
|---|---|---|
| CN | 101456298 | 6/2009 |
| CN | 104009385 A | 8/2014 |

(Continued)

*Primary Examiner* — Erin E McGrath
*Assistant Examiner* — Tiffany T Tran
(74) *Attorney, Agent, or Firm* — Procopio, Cory, Hargreaves & Savitch LLP

(57) ABSTRACT

A laser processing apparatus 10 includes a continuous-wave laser oscillator 12 for generating a continuous-wave laser beam, a condenser lens 18 for concentrating a continuous-wave laser beam onto a workpiece, and a delay time setting means for calculating an energy value for each processing by a continuous-wave laser beam irradiation on the basis of processing data and accumulating the calculated energy value, and setting a predetermined delay time between the processings when the accumulated energy value exceeds a predetermined threshold.

8 Claims, 4 Drawing Sheets

(56) References Cited

U.S. PATENT DOCUMENTS

2017/0223249 A1* 8/2017 Tillotson ................ G02B 23/12
2018/0029163 A1* 2/2018 Capostagno ......... B23K 26/082

FOREIGN PATENT DOCUMENTS

| CN | 106124033 A | 11/2016 |
|----|-------------|---------|
| JP | S61273291 A | 12/1986 |
| JP | H1278988 A | 11/1989 |
| JP | H05144701 A | 6/1993 |
| JP | 2009288197 A | 12/2009 |

* cited by examiner

LASER PROCESSING APPARATUS AND LASER PROCESSING METHOD

TECHNICAL FIELD

The present invention relates to a laser processing apparatus including a continuous-wave laser oscillator for generating a continuous-wave laser beam and a condenser lens for concentrating the continuous-wave laser beam onto a workpiece, and irradiating the workpiece with the continuous-wave laser beam multiple times according to processing data to perform processing multiple times, and a laser processing method.

BACKGROUND ART

Examples of lasers include pulsed lasers that intermittently emit a high-power laser beam and continuous-wave lasers that continuously emit a laser beam. The pulsed laser is good at different types of processing depending on the length of pulse width or the level of repetition frequency. The YAG pulsed laser, for example, has a relatively large pulse width of 0.2 ms to 10 ms and is capable of sufficiently transferring heat to a workpiece to reliably melt the workpiece. Therefore, the YAG pulsed laser is suitable for macroscopic material processing, e.g., welding, cutting, and drilling. However, the YAG pulsed laser has a low repetition frequency of 30 Hz or less, and scanning at high speeds results in distant processing marks (dots), which cannot be recognized as characters. Hence, the YAG pulsed laser is not suitable for surface processing, e.g., marking (printing) or patterning. The Q-switched laser, for example, has a relatively small pulse width in nano-second order. Therefore, the laser radiation is completed before heat is transferred to a workpiece, resulting in insufficient melting of the workpiece. The Q-switched laser is therefore not suitable for material processing, e.g., welding. However, the Q-switched laser is suitable for high-speed surface processing, e.g., marking, because the Q-switched laser is capable of removing only the superficial surface of a workpiece. When a pulsed laser is used to perform different types of processing: material processing and surface processing, it is necessary to use laser processing apparatuses with different oscillation characteristics depending on the type of processing. The resultant problem is increased costs.

The inventor has found that control of the power output and scanning speed of a continuous-wave laser enables material processing and surface processing with a single laser oscillator. However, with a continuous-wave laser, heat accumulation due to continuous laser beam incidence on a condenser lens can be increased excessively, causing the thermal lens effect and a reduction in processing quality. The thermal lens effect is a phenomenon in which a lens itself absorbs a laser beam and has an increased temperature and a change of the refractive index or deformation due to thermal expansion changes the focal position. The change of the focal position increases a spot diameter at a processing point, which reduces the value of the power density (laser power output/cross-sectional area of spot), resulting in a welding defect or a defective character in the case of marking.

Examples of measures against the thermal lens effect include use of a condenser lens made of synthetic quartz glass that hardly absorbs a laser beam. However, a condenser lens made of synthetic quartz glass is very expensive. In addition, the synthetic quartz glass has a temperature coefficient of refractive index (dn/dT) of about $7.5 \times 10^{-6}$, about five times greater than the temperature coefficient of refractive index of a general optical glass (BK7). Thus, there is a drawback that spatter, fume or the like generated during laser processing fouls the lens and the absorption of a laser beam once generated increases the thermal lens effect.

A different measure against the thermal lens effect is a technique proposed in Patent Literature 1 including a projection exposure apparatus in which when an electronic circuit pattern on the surface of a reticle is projected onto the surface of a wafer by a projection optical system during manufacture of a semiconductor device, the optical characteristics change as the lens constituting the projection optical system absorbs the exposure light and has an increased temperature, and such change in optical characteristic is adjusted. Specifically, a change of the shape of the lens due to the thermal expansion is measured with a pressure sensor made of a piezoelectric element, and, on the basis of the measurement results, a change of the focal position of the lens is corrected.

CITATION LIST

Patent Literature

[Patent Literature 1] JP5-144701 A

SUMMARY OF THE INVENTION

Problem to be Solved by the Invention

With the projection exposure apparatus of Patent Literature 1, light emitted from an illumination system and passing through the reticle is incident on the lens over a relatively extensive range. The temperature of the lens thus increases uniformly, and the associated thermal expansion is also uniform. A manner of directly measuring a change of the shape of the lens due to the thermal expansion and adjusting the optical characteristics of the projection optical system on the basis of the measurement results is considered useful for the projection exposure apparatus.

However, in the case of the laser processing apparatus, because heat of a laser beam is locally input to the lens, the associated thermal expansion is not uniform. Therefore, even if the above manner proposed in Patent Literature 1 is applied to the laser processing apparatus, a change of the shape of the lens due to the thermal expansion cannot be measured precisely, and the stable processing is difficult to perform. In addition, the manner proposed in Patent Literature 1 requires a pressure sensor for measuring a change of the shape of the lens or a drive mechanism for correcting a change of the focal position, resulting in a complicated and costly apparatus.

It is an object of the present invention to overcome the aforementioned problem of the conventional technique and to provide a laser processing apparatus and a laser processing method that can easily suppress the thermal lens effect during irradiation of a workpiece with a continuous-wave laser beam via a condenser lens.

Means for Solving the Problem

According to the present invention, in order to achieve the aforementioned object, a laser processing apparatus including a continuous-wave laser oscillator for generating a continuous-wave laser beam and a condenser lens for concentrating the continuous-wave laser beam onto a workpiece, and irradiating the workpiece with the continuous-wave laser beam according to processing data to perform processings includes a delay time setting means for calculating an energy value for each processing by the continuous-wave laser beam irradiation on the basis of the processing data and accumulating the calculated energy value, and setting a predetermined delay time between the processings when the accumulated energy value exceeds a predetermined threshold.

It is preferable that the delay time setting means of the laser processing apparatus according to the present invention be configured to calculate the energy value for each processing by the continuous-wave laser beam irradiation from power output of the continuous-wave laser beam and processing time included in the processing data.

The laser processing apparatus according to the present invention preferably includes a condenser lens rotating means for rotating the condenser lens about an optical axis thereof instead of setting at least one delay time when a cycle time of an entire processing process including the delay time exceeds a permissible cycle time.

In the case of the laser processing apparatus according to the present invention, it is preferable that the processing include welding and the laser processing apparatus include a scanning means for scanning the continuous-wave laser beam to form a welded portion larger than a spot diameter of the continuous-wave laser beam when the welding is performed.

According to the present invention, in order to achieve the aforementioned object, a laser processing method using a laser processing apparatus including a continuous-wave laser oscillator for generating a continuous-wave laser beam and a condenser lens for concentrating the continuous-wave laser beam onto a workpiece and irradiating the workpiece with the continuous-wave laser beam according to processing data to perform processings, includes calculating an energy value for each processing by the continuous-wave laser beam irradiation on the basis of the processing data and accumulating the calculated energy value, and setting a predetermined delay time between the processings when the accumulated energy value exceeds a predetermined threshold.

The laser processing method according to the present invention preferably calculates the energy value for each processing by the continuous-wave laser beam irradiation from power output of the continuous-wave laser beam and processing time included in the processing data.

The laser processing method according to the present invention preferably rotates the condenser lens about an optical axis thereof instead of setting at least one delay time when a cycle time of an entire processing process including the delay time exceeds a permissible cycle time.

In the case of the laser processing method according to the present invention, it is preferable that the processing include welding and the laser processing method scan the continuous-wave laser beam to form a welded portion larger than a spot diameter of the continuous-wave laser beam when the welding is performed.

It is preferable that the processing include welding and marking and the marking be performed on a surface positioned at a level different from that of a surface on which the welding is performed.

In the case of the laser processing method according to the present invention, it is preferable that the marking be performed on a surface positioned closer to the condenser lens than a surface on which the welding is performed is.

Effect of the Invention

With the laser processing apparatus and the laser processing method according to the present invention, the delay time setting means calculates an energy value for each processing by a laser beam and accumulates the calculated energy value, and sets a delay time (interval) between the processings when the accumulated energy value exceeds a predetermined threshold, so that time for cooling the condenser lens is set aside to suppress the thermal lens effect with a simple apparatus configuration. Furthermore, processing requiring different oscillation characteristics: material processing, e.g., welding, and surface processing, e.g., marking, can be performed with a single laser processing apparatus. Therefore, equipment investment costs can be saved significantly, and an installation footprint can be reduced. Furthermore, positioning on a stage for performing several types of processing including welding and marking on a workpiece can be performed at a time, enabling a reduction in processing time. In addition, a repeatability error due to positioning can be minimized when positioning is performed at a time. Additionally, marking lot numbers or the like during processing, e.g., welding, enables reliable recording at the time of processing, thereby increasing traceability accuracy.

EMBODIMENT FOR CARRYING OUT THE INVENTION

Figure 1:
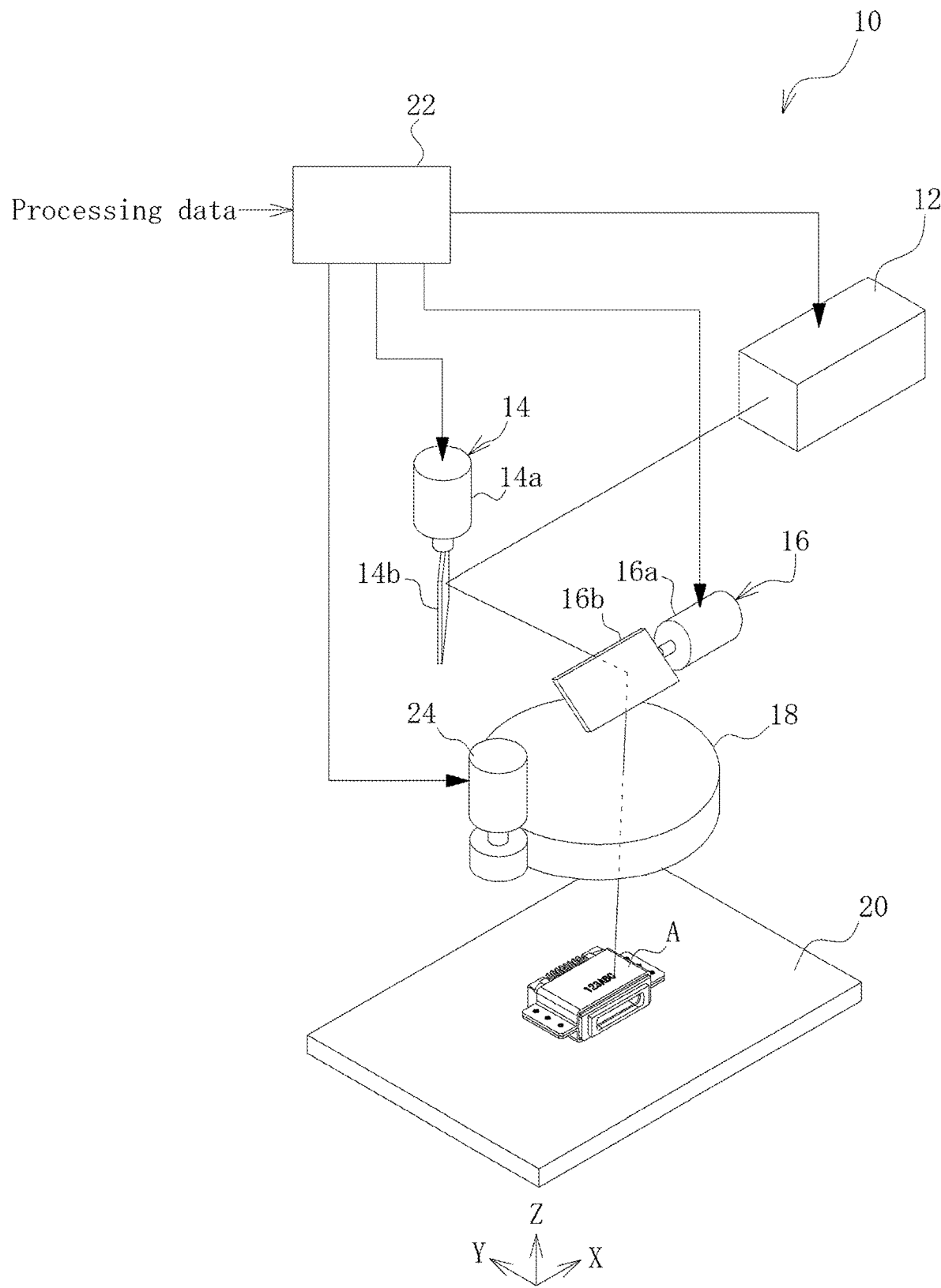
FIG. 1 is a schematic configurational view of a laser processing apparatus according to an embodiment of the present invention.

An embodiment of the present invention is described in detail below on the basis of the drawings. FIG. 1 is a schematic configurational view of a laser processing apparatus according to an embodiment of the present invention.

As illustrated in FIG. 1, a laser processing apparatus 10 according to the present embodiment includes a continuous-wave laser oscillator 12, an X-axis galvano scanner 14, a Y-axis galvano scanner 16, a condenser lens 18, a stage 20 on which a workpiece A is fixed in position, and a control device 22.

The continuous-wave laser oscillator 12 emits a continuous-wave laser beam used for laser processing (hereinafter also simply referred to as the "laser beam") toward the galvano scanners 14 and 16. The continuous-wave laser oscillator 12 may, for example, be a continuous-wave fiber laser of a single-mode light propagation mode having a wavelength of 1000 to 1100 nm.

The X-axis galvano scanner 14 and the Y-axis galvano scanner 16 are cooperated to constitute a scanning means of the present invention. The X-axis galvano scanner 14 and the Y-axis galvano scanner 16 respectively include motors 14a and 16a with a rotary encoder, and mirrors 14b and 16b that are respectively fixed to the rotary shafts of the motors 14a and 16a and reflect the laser beam. The X-axis galvano scanner 14 drives the mirror 14b in a rotating manner to scan the laser beam in an X-axis direction. The Y-axis galvano scanner 16 drives the mirror 16b in a rotating manner to scan the laser beam in a Y-axis direction.

The condenser lens 18 concentrates the laser beam scanned by the X-axis galvano scanner 14 and the Y-axis galvano scanner 16 onto the workpiece A. The condenser lens 18 may be an fθ lens capable of focusing the scanned laser beam on the same surface of the workpiece A subjected to processing.

The control device 22 includes a computer with an arithmetic unit, a memory, various types of interfaces and the like. The control device 22 controls the entire operation of the laser processing apparatus 10. Processing data including the shape, the position, the laser beam power output, the laser beam radiation time (processing time) for each processing are input to the control device 22. On the basis of the input processing data, the control device 22 controls the operation and timing of emitting the laser beam from the continuous-wave laser oscillator 12 and the operation of the X-axis galvano scanner 14 and the Y-axis galvano scanner 16.

The control device 22 is further configured to calculate an energy value for each processing by the laser beam irradiation on the basis of the processing data and accumulate the calculated energy value, and set a predetermined delay time (interval) between the processings when the accumulated energy value exceeds a predetermined threshold. The control device 22 constitutes a delay time setting means of the present invention. Specifically, the control device 22 is configured to calculate an energy value for each processing by the laser beam irradiation from power output of the laser beam and processing time included in the processing data. The energy value for each processing can be determined as a preliminarily measured power corresponding to each power output of a laser beam is multiplied by processing time.

Figure 2:
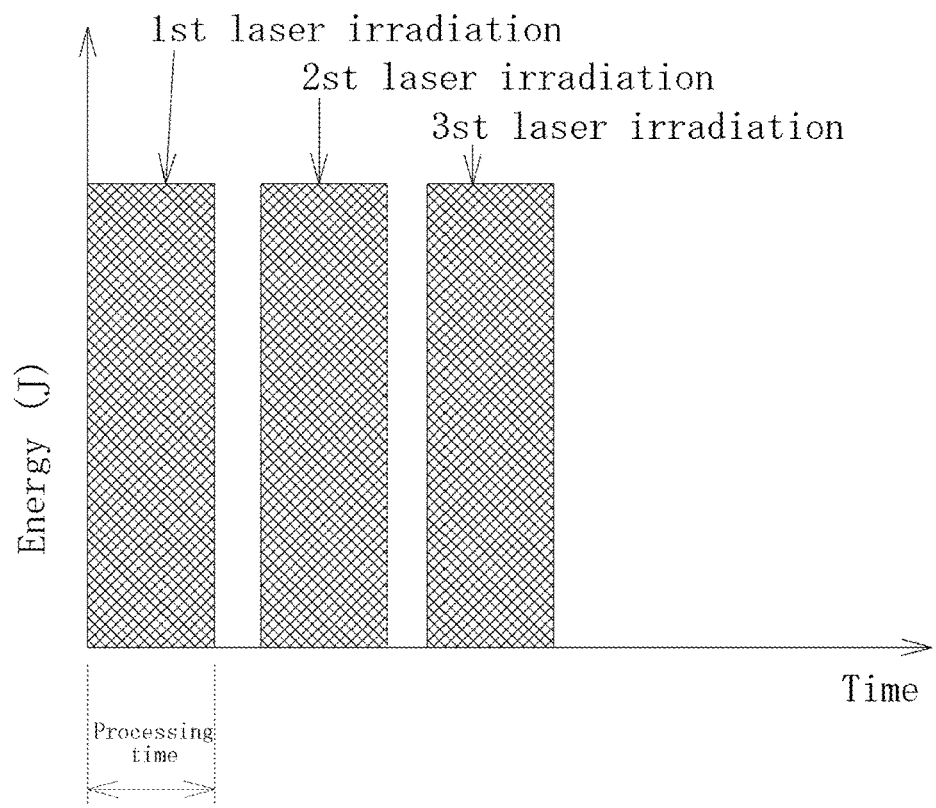
FIG. 2 is a graph illustrating results of measurement of energy of a laser beam obtained as a photodiode is arranged on a stage of the laser processing apparatus of FIG. 1 and the photodiode is irradiated with a laser beam at the same power output and processing time as actual welding processing.

The power can be measured such that a photodiode is arranged on the stage 20 of the laser processing apparatus 10 and the photodiode is irradiated with a laser beam having the same power output as in the case of actual processing. FIG. 2 illustrates results of measurement of energy of a laser beam obtained such that a photodiode is arranged on the stage 20 of the laser processing apparatus 10 and the photodiode is irradiated with a laser beam with the same power output and at the processing time as actual welding processing (welding is performed on three points in the illustrated example). The energy for each laser beam power output measured above is converted into power, which is stored in the memory of the control device 22.

The predetermined threshold of the accumulated energy value is a reference to determine whether a temperature increase of the condenser lens 18 due to the absorption of the laser beam falls within a permissible range in terms of the thermal lens effect. The correlation between the accumulated energy value and the temperature increase of the condenser lens 18 can be obtained as the power is measured with the photodiode and a change of the temperature of the condenser lens 18 is measured with a thermocouple or the like.

Figure 3:
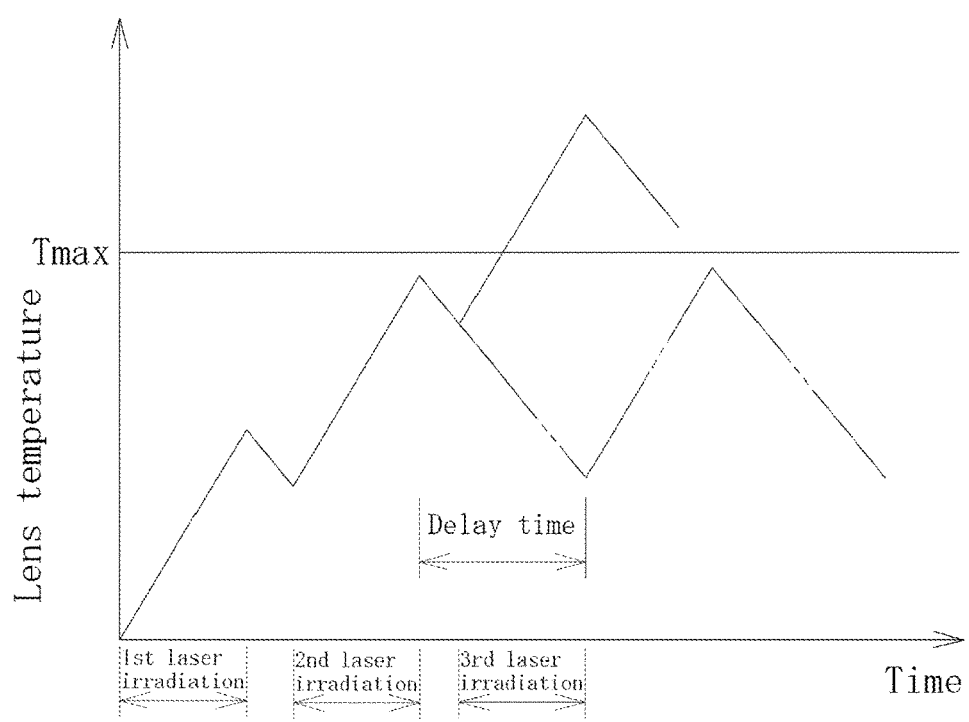
FIG. 3 is a graph illustrating results of measurement of a change of temperature of a condenser lens with a thermocouple, the change being obtained as a photodiode is irradiated with a laser beam at the same power output and processing time as actual welding processing.

FIG. 3 illustrates results of measurement of a change of the temperature of the condenser lens 18 with a thermocouple, the change being obtained when a photodiode is irradiated with a laser beam with the same power output and at the same processing time as in the case of actual welding processing (welding is performed on three points in the illustrated example). A permissible temperature Tmax in the drawing is a maximum temperature of the condenser lens 18 at which the processing quality can be secured even when the thermal lens effect occurs. By the laser beam radiation to the second point, the temperature increase of the condenser lens 18 is equal to or less than the permissible temperature Tmax. By the laser beam radiation for the third point, the temperature increase of the condenser lens 18 is understood to exceed the permissible temperature Tmax. According to the correlation between the temperature increase of the condenser lens 18 and the accumulated energy value, in this example, the predetermined threshold corresponds to the accumulation of the energy value to the second point.

In addition to the measurement of the temperature increase of the condenser lens 18, a temperature drop rate of the condenser lens 18 in the case of stop of laser beam radiation is measured. The temperature drop rate may be used in determining a delay time set between the processings. A description is given below on the basis of the example of FIG. 3. A delay time may be time required for the temperature of the condenser lens 18 immediately after the laser beam radiation for the second point to drop to the temperature at the time before the laser beam radiation for the second point. The laser beam radiation for the third point after such delay time prevents the temperature of the condenser lens 18 from exceeding the permissible temperature Tmax as indicated by the imaginary line in the drawing.

The control device 22 may calculate the energy value for each processing on the basis of the processing data and accumulate the calculated energy value, and set a predetermined delay time between all the subsequent processing when the accumulated energy value once exceeds the predetermined threshold.

As illustrated in FIG. 1, the laser processing apparatus 10 of the present embodiment includes a wheeled motor 24 for rotating the condenser lens 18 about an optical axis thereof. The control device 22 actuates the motor 24 and rotates the condenser lens 18 about an optical axis thereof instead of setting at least one delay time when the cycle time of the entire processing process including the delay time exceeds the permissible cycle time. Thus, the motor 24 and the control device 22 constitute the condenser lens rotating means of the present invention. Rotation of the condenser lens 18 during laser processing can result in a reduction in processing quality due to oscillations or the like of the condenser lens 18. Therefore, the condenser lens 18 is preferably rotated in the intervals of processing.

Figure 4:
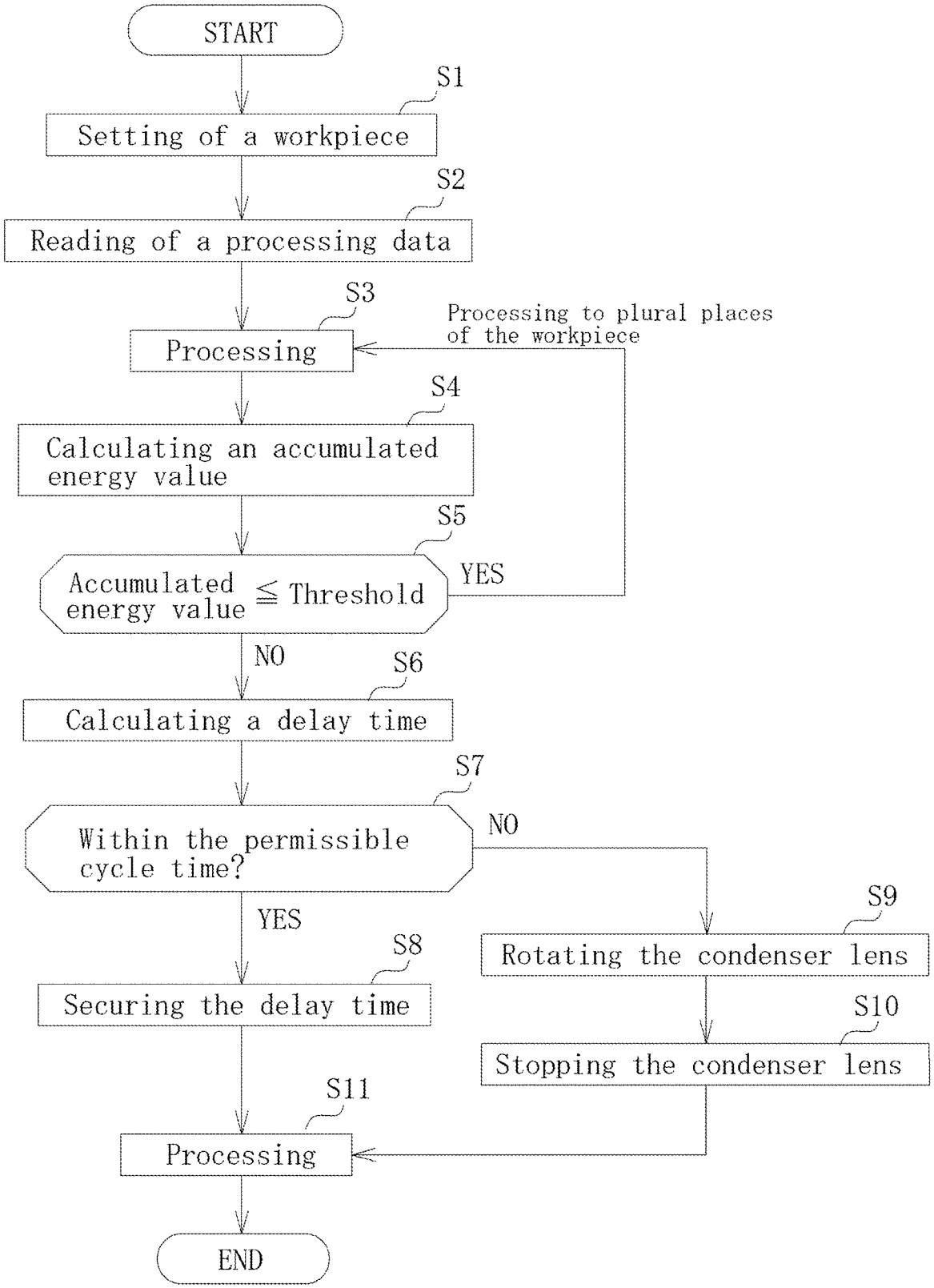
FIG. 4 is a flowchart indicating a process of a laser processing method according to an embodiment of the present invention.

Next, a laser processing method of an embodiment according to the present invention using the laser processing apparatus 10 configured in the aforementioned manner is described on the basis of the flowchart of FIG. 4.

In the laser processing method of the present embodiment, the workpiece A is positioned and fixed on the stage 20 in step S1, the processing data input is read by the control device 22 in step S2, the laser beam is emitted to process (e.g. weld) the workpiece A in step S3, the control device 22, which is a delay time setting means, calculates an energy value for each processing by the laser beam irradiation on the basis of the processing data and accumulates the calculated energy value in step S4, and the control device 22, which is a delay time setting means, determines whether the accumulated energy value is equal to or less than the predetermined threshold. When the accumulated energy value is equal to or less than the predetermined threshold, the control device 22 determines that the temperature increase of the condenser lens 18 falls within the permissible temperature, and the step returns to step S3 to perform the next processing (e.g., welding). When, the accumulated energy value exceeds the predetermined threshold in step S5, the control device 22, which is a delay time setting means, calculates a required delay time (interval) in step S6. In subsequent step S7, the control device 22 determines whether the cycle time of the entire processing process including the delay time falls within the preset permissible cycle time. When the cycle time falls within the permissible cycle time, after elapse of the delay time in step S8, the subsequent processing (e.g., marking) is performed in step S11. Thus, the processing is completed. When the cycle time of the entire processing process including the delay time exceeds the permissible cycle time in step S7, instead of setting aside a delay time, the condenser lens 18 is rotated about an optical axis thereof only a predetermined angle in step S9. The condenser lens 18 is stopped in subsequent step S10, and the subsequent processing (e.g., marking) is performed in step S11. Thus, the processing is completed.

With the laser processing apparatus 10 and the laser processing method of the present embodiment, the control device 22 calculates the energy value for each processing by the laser beam and accumulates the calculated energy value, and sets a delay time (interval) between the processings when the accumulated energy value exceeds the predetermined threshold, so that the time for cooling the condenser lens 18 is set aside. Thus, the thermal lens effect can be suppressed by a simple apparatus configuration. Furthermore, processing requiring different oscillation characteristics: material processing, e.g., welding, and surface processing, e.g., marking, can be performed with the single laser processing apparatus 10. The equipment investment costs can be saved significantly, and the installation footprint can be reduced. Furthermore, positioning on the stage 20 for performing several types of processing including welding and marking on the workpiece A can be performed at a time, enabling a reduction in processing time. In addition, a repeatability error due to positioning can be minimized when positioning is performed at a time. Additionally, marking lot numbers or the like during processing, e.g., welding, enables reliable recording at the time of processing, thereby increasing traceability accuracy.

Figure 5:
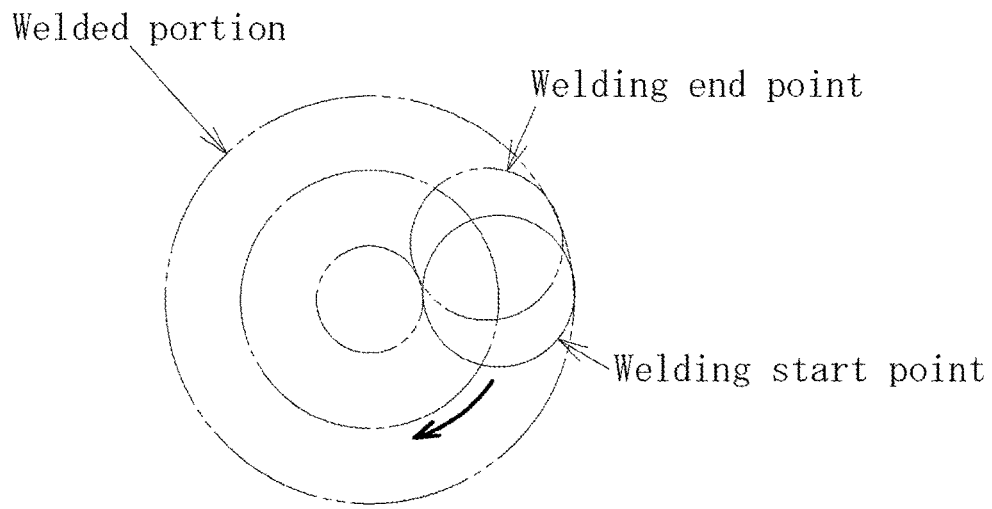
FIG. 5 is a schematic view illustrating a state in which a laser beam is scanned circumferentially to form a welded portion larger than a spot diameter of the laser beam.

Incidentally, in cases where welding is performed such that the laser beam is emitted to a fixed point of a portion to be welded, when the laser power output is small, the welded portion has a small diameter and thus has insufficient strength. When the laser power output is large, a defect is so generated that a hole is opened in the workpiece A. Therefore, it is not easy to secure processing quality in the case of welding by means of fixed-point radiation. Given the above, with the laser processing apparatus 10 and the laser processing method of the present embodiment, as illustrated in FIG. 5, the X-axis galvano scanner 14 and the Y-axis galvano scanner 16, which are scanning means, are configured to scan the laser beam such that the spot moves along the circular trajectory (the long dashed short dashed line in the drawing) to form a welded portion larger than the spot diameter of the laser beam. Thus, the formation of an opening in the welded portion is prevented and the welded portion having a large diameter is formed to increase the strength of the welded portion. In order to prevent local heating as the trajectory of the spot of the laser beam is small, the diameter of the trajectory of the spot of the laser beam is preferably twice or more larger than the spot diameter of the laser beam. The spot of the laser beam may be scanned along, for example, an elliptical or polygonal trajectory.

Figure 6:
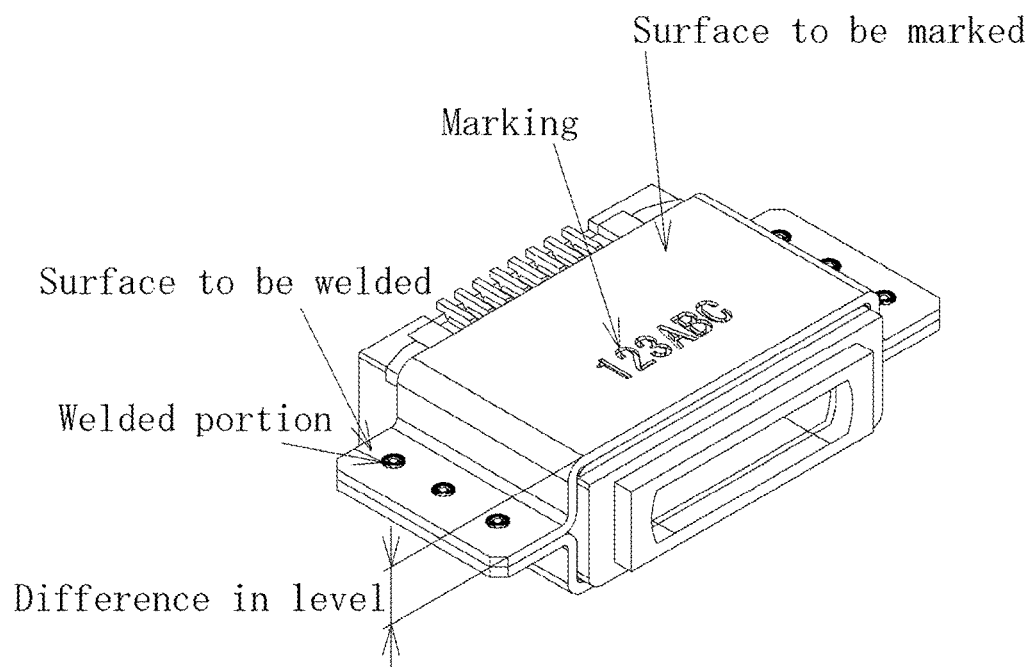
FIG. 6 is a perspective view of a workpiece illustrating a state in which a weld and a marking are formed on surfaces of a workpiece at different levels.

When welding is performed using the laser beam, the spot diameter is preferably small (e.g., about 0.06 mm) to have an increased energy density. However, a line formed by the marking with the above spot diameter is too small and has low visibility. Therefore, with the laser processing apparatus 10 and the laser processing method of the present embodiment, it is preferable that the laser beam come into focus on the surface to be welded, but be unfocused on the surface to be marked so that the spot diameter increases. This may also be done when at least one of the condenser lens 18 and the stage 20 is moved in the Z-axis direction (see FIG. 1). However, as illustrated in FIG. 6, this may be done by a simple method in which a level difference in the height direction (Z-axis direction) is preliminarily formed on the workpiece A between the surface to be welded and the surface to be marked. When viewed from the condenser lens 18, the power distribution of the laser beam is uniform more on the near side than on the far side with respect to the focus of the laser beam. Specifically, the power is concentrically distributed relative to the spot diameter. Therefore, marking is preferably performed on the surface positioned closer to the condenser lens 18 than the surface to be welded is.

Heretofore, the present invention has been described on the basis of the illustrated example. However, the present invention is not limited to the aforementioned embodiment, but additions and changes may be made within the scope of the claims. For example, the condenser lens 18 may be a telecentric lens.

INDUSTRIAL APPLICABILITY

According to the present invention, the laser processing apparatus and the laser processing method capable of simply suppressing the thermal lens effect during the irradiation of the workpiece with the continuous-wave laser beam via the condenser lens can be provided.

DESCRIPTION OF REFERENCE NUMERALS 10 laser processing apparatus
12 continuous-wave laser oscillator
14 X-axis galvano scanner
16 Y-axis galvano scanner
18 condenser lens
20 stage
22 control device
24 wheeled motor

What is claimed is:
1. A laser processing apparatus comprising:
a continuous-wave laser oscillator configured to generate a continuous-wave laser beam; and
a condenser lens configured to concentrate the continuous-wave laser beam onto a workpiece,
the laser processing apparatus configured to irradiate the workpiece with the continuous-wave laser beam according to processing data to perform processings,
the laser processing apparatus comprising a controller, the controller being configured to calculate an energy value for each processing by the continuous-wave laser beam irradiation based on the processing data and accumulate the calculated energy value, and set a predetermined delay time between the processings when the accumulated energy value exceeds a predetermined threshold, wherein the controller is configured to set the predetermined delay time based on a calculated maximum temperature associated with the condenser lens, and a measured temperature drop rate associated with the condenser lens.

2. The laser processing apparatus according to claim 1, wherein the controller is configured to calculate the energy value for each processing by the continuous-wave laser beam irradiation from power output of the continuous-wave laser beam and processing time included in the processing data.

3. The laser processing apparatus according to claim 1, comprising a motor configured to rotate the condenser lens about an optical axis thereof instead of setting at least one delay time when a cycle time of an entire processing process including the delay time exceeds a permissible cycle time.

4. The laser processing apparatus according to claim 2, comprising a motor configured to rotate the condenser lens about an optical axis thereof instead of setting at least one delay time when a cycle time of an entire processing process including the delay time exceeds a permissible cycle time.

5. The laser processing apparatus according to claim 1, wherein the processing includes welding, and the laser processing apparatus comprises a scanner configured to scan the continuous-wave laser beam to form a welded portion larger than a spot diameter of the continuous-wave laser beam when the welding is performed.

6. The laser processing apparatus according to claim 2, wherein the processing includes welding, and the laser processing apparatus comprises a scanner configured to scan the continuous-wave laser beam to form a welded portion larger than a spot diameter of the continuous-wave laser beam when the welding is performed.

7. The laser processing apparatus according to claim 3, wherein the processing includes welding, and the laser processing apparatus comprises a scanner configured to scan the continuous-wave laser beam to form a welded portion larger than a spot diameter of the continuous-wave laser beam when the welding is performed.

8. The laser processing apparatus according to claim 4, wherein the processing includes welding, and the laser processing apparatus comprises scanner configured to scan the continuous-wave laser beam to form a welded portion larger than a spot diameter of the continuous-wave laser beam when the welding is performed.

* * * * *